(12) United States Patent
Kamata

(10) Patent No.: US 6,584,281 B2
(45) Date of Patent: Jun. 24, 2003

(54) LENS-FITTED PHOTO FILM UNIT AND METHOD OF PRODUCING PHOTOGRAPHIC PRINT

(75) Inventor: Kazuo Kamata, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/956,825

(22) Filed: Sep. 21, 2001

(65) Prior Publication Data

US 2002/0057907 A1 May 16, 2002

(30) Foreign Application Priority Data

Sep. 22, 2000 (JP) ........................ 2000-289221
Sep. 22, 2000 (JP) ........................ 2000-289222

(51) Int. Cl.$^7$ ..................... G03B 17/00; G03B 17/24
(52) U.S. Cl. ........................... 396/60; 396/311
(58) Field of Search ................. 396/60, 311, 380

(56) References Cited

U.S. PATENT DOCUMENTS

| | | | |
|---|---|---|---|
| 5,950,025 A | | 9/1999 | Uchiyama et al. |
| 5,966,548 A | * | 10/1999 | Kamata ................ 396/310 |
| 6,192,198 B1 | * | 2/2001 | Kitani et al. ........... 396/122 |
| 6,249,652 B1 | | 6/2001 | Kamata et al. |
| 6,263,167 B1 | * | 7/2001 | Kamata et al. .......... 396/311 |
| 6,311,018 B1 | * | 10/2001 | Lawther ................. 396/210 |
| 6,429,924 B1 | * | 8/2002 | Milch .................... 396/311 |
| 2002/0031340 A1 | * | 3/2002 | Kamata .................. 396/311 |

FOREIGN PATENT DOCUMENTS

| | | | | |
|---|---|---|---|---|
| EP | 0 430 097 A2 | * | 11/1990 | ........ G03B/17/24 |
| JP | 08-304883 | | 11/1996 | |

* cited by examiner

*Primary Examiner*—Russell Adams
*Assistant Examiner*—Andrew Sever
(74) *Attorney, Agent, or Firm*—Young & Thompson

(57) ABSTRACT

A lens-fitted photo film unit has a taking lens of a fixed focal length, through which picture frames are photographed in respective exposure areas in a constant size on a photo filmstrip. Prior to loading the photo filmstrip in the lens-fitted photo film unit, three dots are prerecorded on each PAR code recording zone of the photo filmstrip, to indicating that a predetermined size photographic print is to be produced from a predetermined central fragment of each of the picture frames by enlarging at a specific print magnification. The lens-fitted photo film unit has an optical viewfinder that shows the photographer a subject at a corresponding magnification and a corresponding angle of view to an image contained in a photographic print of the predetermined size as produced from the central fragment.

10 Claims, 18 Drawing Sheets

LENS-FITTED PHOTO FILM UNIT AND METHOD OF PRODUCING PHOTOGRAPHIC PRINT

BACKGROUND OF THE INVENTION

1. Field of the Invention

The present invention relates a lens-fitted photo film unit and a method of producing a photographic print, especially from picture frames photographed by the lens-fitted photo film unit.

2. Description Related to the Prior Art

The lens-fitted photo film unit is pre-loaded with an unexposed photo film cartridge and provided with simple mechanisms for taking an exposure. There have been suggested a variety of types of lens-fitted photo film units. A type of lens-fitted photo film unit is disclosed for example in Japanese Laid-open Patent Application No. 8-304883 and U.S. Pat. No. 5,950,025, that uses an IX240 type photo film cartridge of the Advanced Photo System, and has a view field changing mechanism for changing the view field between a C (conventional) size, a H (high-vision) size and a P (panoramic) size, wherein the C size represents an aspect ratio of about 1.4, the H size represents an aspect ratio of about 1.8, and the P size represents an aspect ratio of about 3. The photographer may select one of these three aspect ratios for each exposure.

This prior film unit is also provided with a device for recording optical indicia indicating the selected aspect ratio at each exposure on a predetermined marginal position outside each picture frame. The optical indicia conventionally consists of zero to two dots, and is called PAR (Print Aspect Ratio) code. Every picture frame is photographed in a full size that has the H size aspect ratio on the IX240 type photo filmstrip, but a print area of each picture frame and a print magnification are individually determined in accordance with the assigned PAR code. Thus, a C size print (89×127 mm), a H size print (89×158mm) or a P size print (89×254 mm) is produced from the print area of each picture frame.

Another type of lens-fitted photo film unit and a method of producing photographic prints from this type of lens-fitted photo film unit are disclosed in U.S. Pat. Nos. 6,249,652 and 6,263,167. The lens-fitted photo film unit of this type contains also an IX240 type photo film cartridge, and has a switching device for allowing the photographer to select a print magnification and a print aspect ratio from among several options. Every picture frame is photographed in the same size through a taking lens of a fixed focal length, and two kinds of optical indices are recorded on the photo filmstrip, for designating print conditions for each picture frame, including the print magnification and the print aspect ratio. In accordance with the optical indicia, a photographic print of a constant size is produced from the full size picture frame or a central fragment of the full size picture frame by use of a standard magnification or a correspondingly larger magnification. When merely the central fragment of the picture frame is printed at the larger magnification, the subsequent photographic print looks as if it were photographed by a taking lens of a longer focal length as compared to the photographic print that is produced from the full size picture frame by use of the standard magnification. Such a photographic print may be called a pseudo zoom print or a tele-converted print.

As described in the above prior arts, a digital printer has been known in the art, that photoelectrically scans each picture frame on a photo filmstrip and projects light beams to expose a photographic paper in accordance with image data obtained by scanning.

Although the Advanced Photo System and the digital printer have given a wider variety of photographic prints, it has been difficult to introduce such a printing system in practice that is versatile and is capable of producing a great variety of photographic prints automatically from those photo filmstrips exposed by the lens-fitted photo film units, without the need for any complicated operation or expensive structures.

SUMMARY OF THE INVENTION

In view of the foregoing, an object of the present invention is to provide a lens-fitted photo film unit and a photographic print producing method, which permit producing photographic prints in different print formats automatically at a low cost.

Another object of the present invention is to provide a lens-fitted photo film unit and a photographic print producing method, which permit producing tele-converted photographic prints at a low cost automatically without the need for any complicated operation or expensive structures.

Another object of the present invention is to provide a lens-fitted photo film unit and a photographic print producing method, which permit producing pseudo zoom photographic prints each at a pseudo zoom ratio that is selectable by the photographer from among several options, automatically at a low cost.

According to an aspect of the present invention, a lens-fitted photo film unit comprises:

a taking lens having a fixed focal length, through which picture frames are photographed in respective exposure areas in a constant size on a preloaded photo filmstrip;

print format data prerecorded on the photo filmstrip prior to loading the photo filmstrip in the lens-fitted photo film unit, the print format data indicating that a predetermined size photographic print is to be produced from a predetermined central fragment of each of the picture frames by enlarging at a specific print magnification; and an optical viewfinder having a view field corresponding to the central fragment of the picture frame, and a magnification corresponding to the specific print magnification, so a subject observed in the view field corresponds in magnification as well as in angle of view to an image contained in a photographic print of the predetermined size as produced from the central fragment.

A method of producing photographic prints from picture frames photographed by a lens-fitted photo film unit comprises the following steps:

recording, prior to loading an unexposed photo filmstrip in the lens-fitted photo film unit, print format data on the photo filmstrip, the print format data designating that a photographic print of a predetermined size is to be produced from a predetermined central fragment of each of the picture frames;

reading out the data from the photo filmstrip after the photo filmstrip is developed; and printing an image of the central fragment of each of the picture frames onto photographic paper by enlarging at a specific print magnification that is determined based on the size of the central fragment relative to the predetermined print size.

According to another aspect of the present invention, a lens-fitted photo film unit comprises:

a taking lens having a fixed focal length, through which picture frames are photographed in respective exposure areas in a constant size on a preloaded photo filmstrip;

an externally operable zoom ratio selecting device for selecting a zoom ratio from among several options;

a view field changing device for changing a view field of a viewfinder according to the selected zoom ratio while maintaining the view field in a same aspect ratio; and an optical data recording device for recording a variable number of dots optically on the photo filmstrip adjacent each of the picture frames at each exposure, the number of the dots varying depending upon the selected zoom ratio, wherein photographic prints of a predetermined size are produced by enlarging different print areas at different print magnifications from one picture frame to another in accordance with the selected zoom ratio represented by the number of the dots.

The focal length of the taking lens is preferably 20 mm to 25 mm. The view field changing device preferably comprises a movable conversion lens that is moved along an optical axis of a finder optical system in cooperation with the zoom ratio selecting device, to change a finder magnification according to the selected zoom ratio.

According to a preferred embodiment, the optical data recording device records the dots in a data recording zone that is located in a predetermined position adjacent each exposure area, the data recording zone being otherwise used for recording an aspect ratio code consisting of zero to two dots to designate a print aspect ratio for a respective picture frame.

A method of producing a photographic print from picture frames photographed by a lens-fitted photo film unit having a taking lens of a fixed focal length, comprises the following steps:

recording film data on an unexposed photo filmstrip, prior to loading the photo filmstrip in the lens-fitted photo film unit, the film data indicating that the photo filmstrip is directed to producing photographic prints in a predetermined size by enlarging different print areas at different print magnifications from one picture frame to another;

recording a number of dots optically on the photo filmstrip in association with each picture frame at each exposure, the number of the dots representing one of zoom ratios that is selected by a photographer;

detecting the film data and the number of the dots for each picture frame after the photo filmstrip is developed;

selecting, when the film data is detected, a print area and a print magnification from among predetermined options in accordance with the selected zoom ratio represented by the number of the dots detected for each picture frame; and printing an image of the selected print area at the selected print magnification onto photographic paper.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
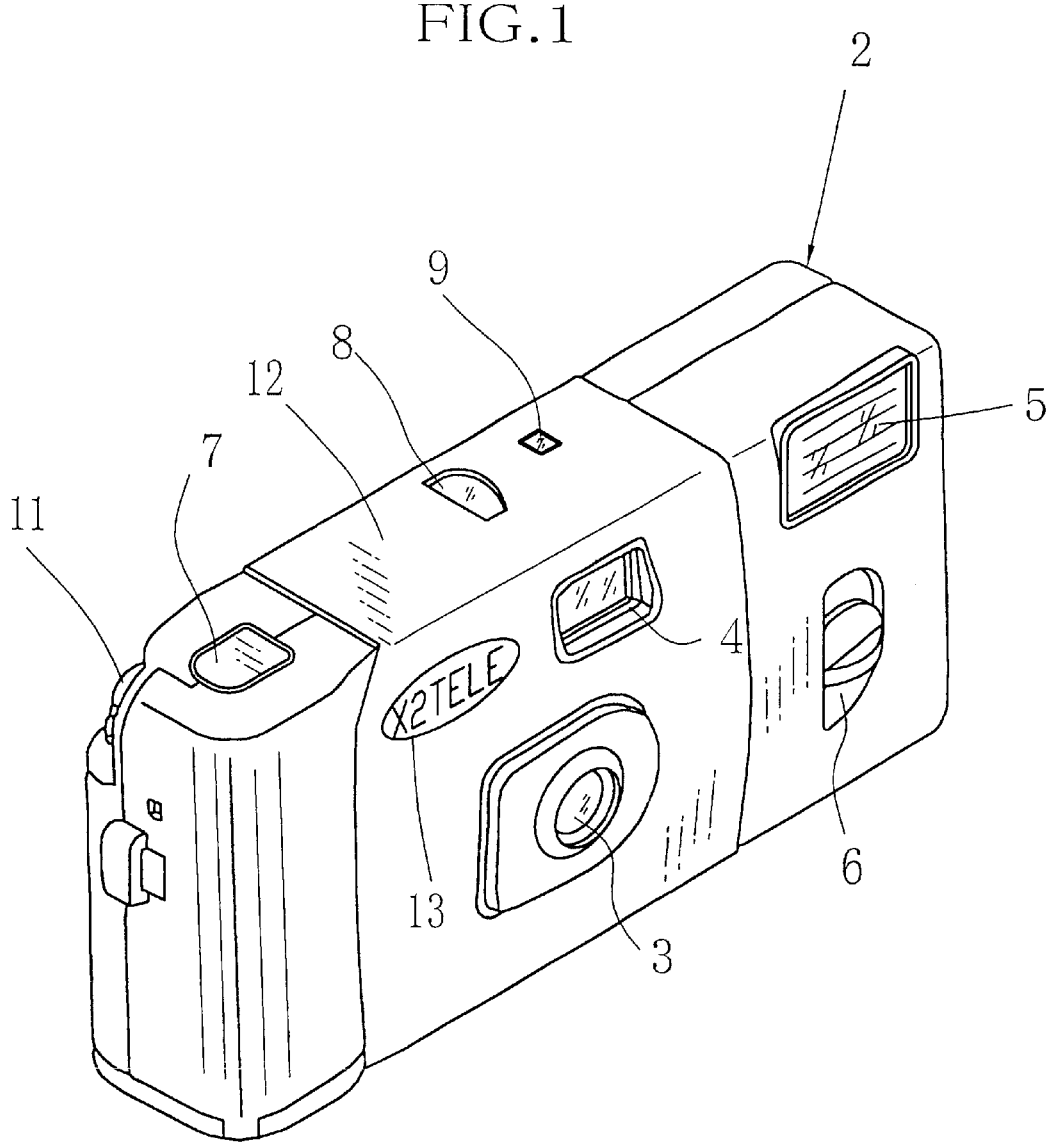
FIG. 1 is a perspective view illustrating a tele-converting type lens-fitted photo film unit according to a first embodiment of the present invention.

In FIG. 1, a lens-fitted photo film unit 2 of the present invention has a taking lens 3, a finder objective window 4, a flash projector 5 and a flash ON-OFF knob 6 on its front side. The taking lens 3 has a fixed focal length that is 24 mm in this embodiment. On the top side of the lens-fitted photo film unit 2 are provided a release button 7, a frame counter 8 and a charge condition indicator 9. A film winding wheel 11 and a finder eyepiece window 10 are provided on the rear side. A label 12 is put around the housing of the lens-fitted photo film unit 2, and a caption 13 of "2× TELE" is printed on an upper front portion of the label 13. The caption 13 of "2× TELE" indicates that the lens-fitted photo film unit 2 is a pseudo telephoto film unit that is directed to tele-converting printing at a 2× level of magnification, whereby only a central fragment of each picture frame photographed by the lens-fitted photo film unit 2 is printed in a standard size by use of a magnification that is 2-times as large as a standard magnification that is used for making the standard size print from a nearly whole area of the picture frame.

Figure 2:
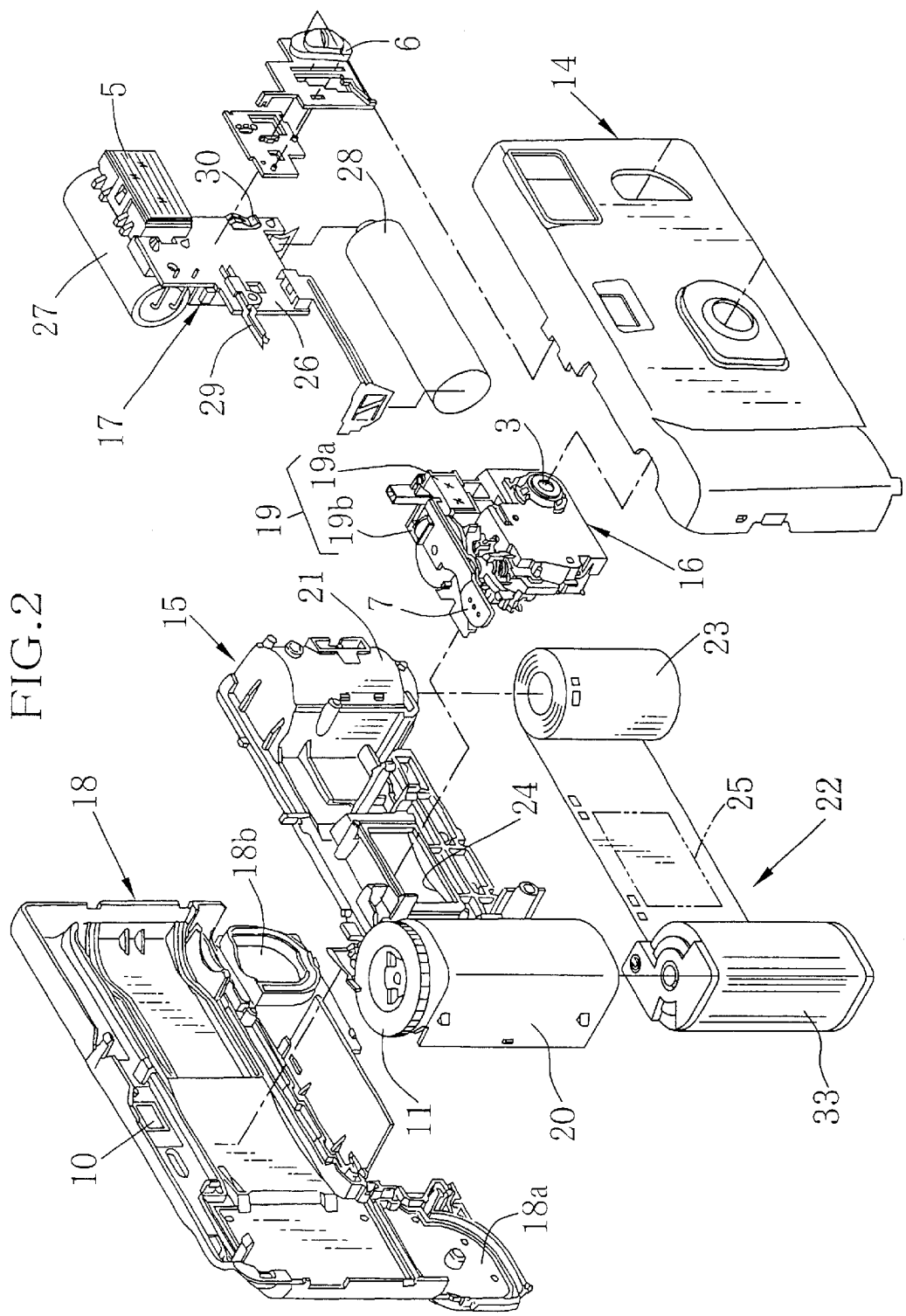
FIG. 2 is an exploded perspective view illustrating the lens-fitted photo film unit of the first embodiment.

As shown in FIG. 2, the lens-fitted photo film unit 2 is constituted of a front cover 14, a basic portion 15, an exposure unit 16, a flash unit 17, and a rear cover 18. The taking lens 3 and other photographic mechanisms, such as a shutter mechanism, are integrated into the exposure unit 16. Also a finder optical system 19 consisting of an objective lens 19a and an eyepiece lens 19b is mounted on the top of the exposure unit 16. The basic portion 15 has a cartridge chamber 20 and a film roll chamber 21 formed integrally on opposite ends thereof. A photo film cartridge 22 and a roll of unexposed photo filmstrip 23, that is pulled out from the photo film cartridge 22, are loaded in the cartridge chamber 20 and the film roll chamber 21 respectively. Thereafter, the rear cover 18 closes the rear side of the basic portion 15, and bottom lids 18a and 18b, which are formed integrally with the rear cover 18, close bottom sides of the chambers 20 and 21.

The film winding wheel 11 is mounted on the top of the cartridge chamber, and is engaged with a spool of the photo film cartridge 22. The film winding wheel 11 is rotatable in a direction to wind up the filmstrip 23 from the film roll chamber 21 into the photo film cartridge 22. An exposure opening 24 is formed between the film roll chamber 21 and the cartridge chamber 20, and the exposure unit 16 is attached to the front of the exposure opening 24. The release button 7 is mounted on the top of the exposure unit 16, and is pressed to release the shutter mechanism of the exposure unit 16. The shutter mechanism is a type in which a shutter blade is swung back and forth for one time in front of a shutter opening. Each time the shutter mechanism is released, a subject light enters through the taking lens 3 and the shutter opening, so a subject image is photographed as a picture frame in an exposure area 25 of the filmstrip 23 that is placed behind the exposure opening 24. The filmstrip 23 is wound up frame by frame after each exposure.

The flash unit 17 is constituted of a printed circuit board 26, a main capacitor 27, a battery 28, a trigger switch 29, a flash switch 30, the flash projector 5 and other minor elements. When the flash ON-OFF knob 6 is slid up, the flash switch 30 is turned on to start charging the main capacitor 27. When the release button 8 is pressed after the main capacitor 27 is charged up, the trigger switch 29 is turned on by the shutter blade at the moment when the shutter opening is fully opened. Then the main capacitor 27 discharges through a flash discharge tube of the flash projector 5, so a strobe of flash light is projected from the flash projector 5 toward a subject.

Figure 3:
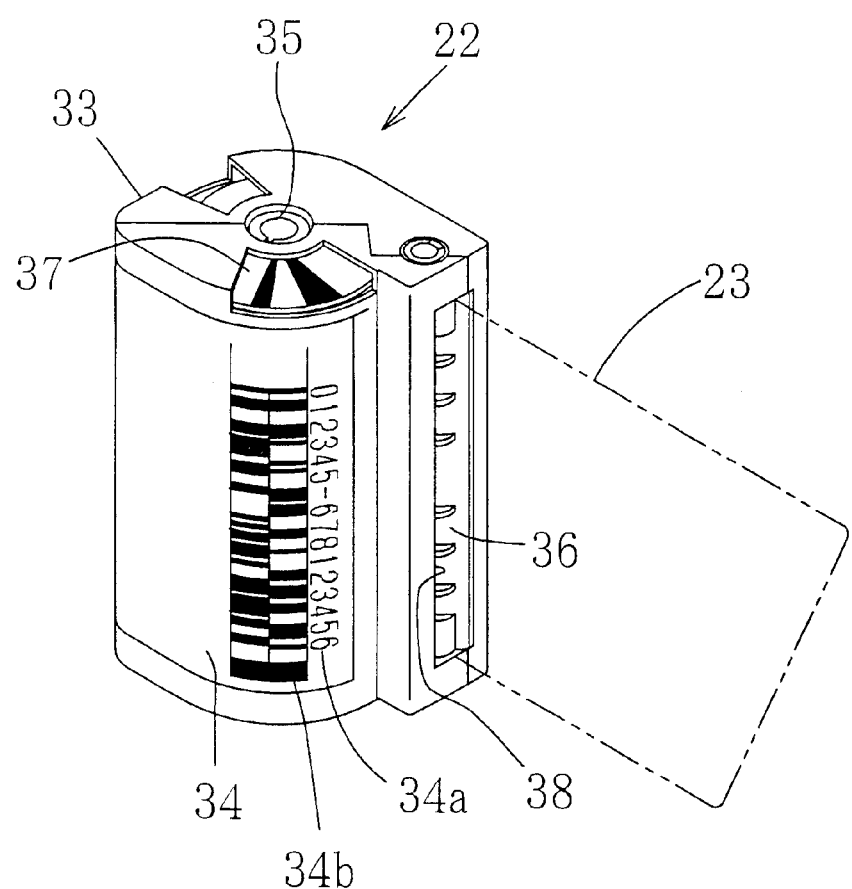
FIG. 3 is a perspective view illustrating an IX240 type photo film cartridge.

FIG. 3 shows the photo film cartridge 22 in detail. The photo film cartridge 22 is of IX240 type. The photo film cartridge 22 is constituted of the photo filmstrip 23, a cartridge shell 33 for containing the filmstrip 23, and a label 34 put around the cartridge shell 33. The cartridge shell 33 is provided with the spool 35, a light-shielding door member 36, a data disc 37, a not-shown film advancing mechanism and a not-shown spool lock mechanism. The label 34 has a numerical code 34a and a bar code 34b printed thereon. These codes represent information on the type of the filmstrip 23, the number of available frames and the cassette ID number.

The door member 36 opens or closes a film port 38 through which the filmstrip 23 gets into or out of the cartridge shell 33. Before and after the photo film cartridge 22 is used, the entire length of the filmstrip 23 is coiled around the spool 35 and located inside the cartridge shell 33, and the door member 36 shields the inside of the cartridge shell 33 from ambient light. Because of the film advancing mechanism, a leading end of the filmstrip 23 as located inside the cartridge shell 33 may be and advanced out of the cartridge shell 33 by rotating the spool 35 in a direction to unwind the filmstrip 23 as coiled around the spool 35. The spool lock mechanism locks the spool 35 while the door member 36 is closed. A trailing end of the filmstrip 23 is removably fastened to the spool 35, so the filmstrip 23 may be removed from the cartridge shell 33, for instance, for the purpose of development.

Figure 4:
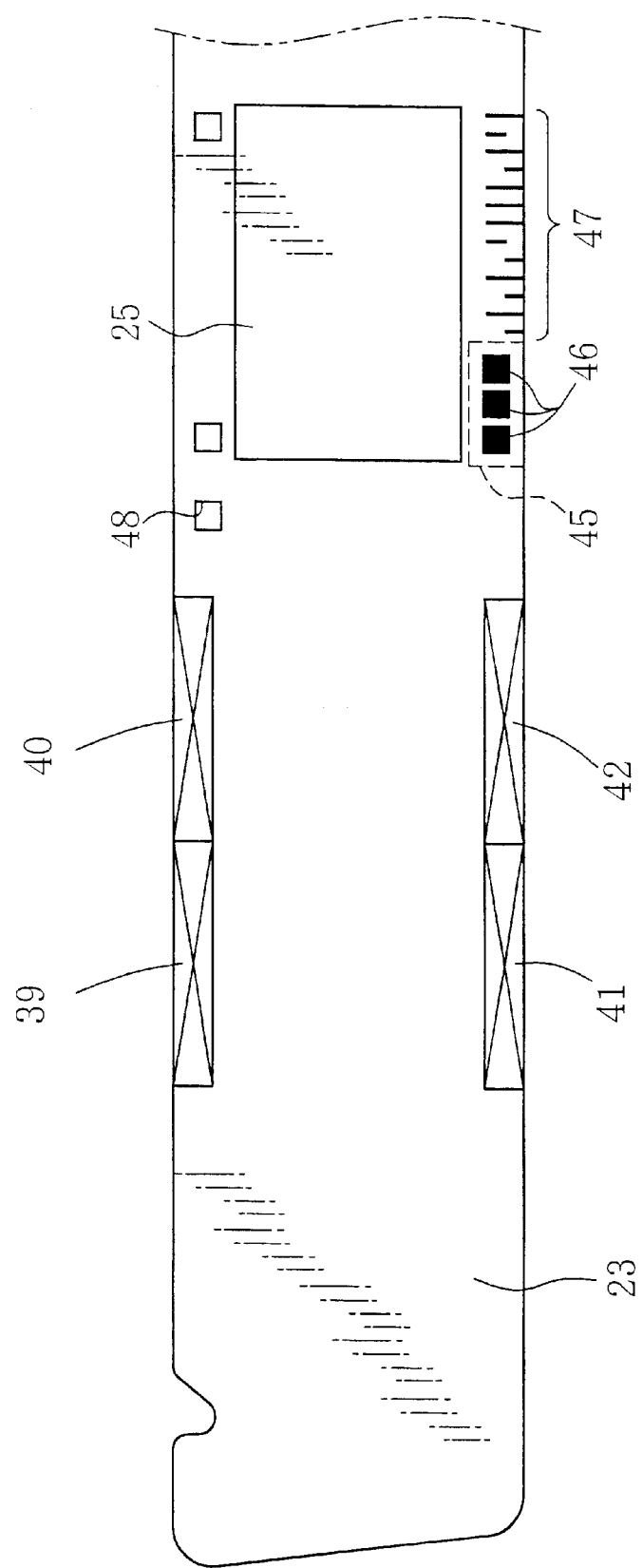
FIG. 4 is an explanatory view illustrating a photo filmstrip of the IX240 type that is pre-loaded in the lens-fitted photo film unit of the first embodiment.

As shown in FIG. 4, four data recording zone 39, 40, 41 and 42 are provided along opposite side edges of either end portion of the filmstrip 23, which are not used for photographing picture frames. A PAR code recording zone 45 is provided in a predetermined marginal portion outside each exposure area 25. It is to be noted that the position of each exposure area 25 and thus the position of the PAR code recording zone 45 are predetermined in the IX240 type filmstrip 23, because perforations 48 are so arranged along the filmstrip 23 that they designate positions of the respective exposure areas 25 in the lengthwise direction of the filmstrip 23.

During the manufacture of the filmstrip 23, a manufacturing lot number and a film ID number are recorded as photographic latent images on the data recording zones 39 and 40, and bar codes representative of the same manufacturing lot number and the same film ID number are recorded as photographic latent image on the other data recording zones 41 and 42. Also a bar code 47 representative of a frame serial number is recorded as a photographic latent image under each exposure area 25 adjacent to the PAR code recording zone 45. In addition, before the filmstrip 23 is loaded in the lens-fitted photo film unit 2 of the present embodiment, three dots 46 are recorded as a photographic latent image on every PAR code recording zone 45. These latent images become visible when the filmstrip 23 is developed.

According to a printing method for the lens-fitted photo film unit 2 of the present embodiment, the three dots 46 recorded in each PAR code recording zone 45 represents a code that designates tele-converting printing at a 2× level of magnification. That is, when the PAR code consisting of three dots is assigned to a picture frame, a central quarter of the exposure area 25 is defined as a print area, and is printed in a standard size, the C size in this embodiment, by use of a magnification that is twice a standard magnification of printing that is used for making the C size print from a standard print area for the C size. It is to be noted that the standard print area for the C size is conventionally about 69% of the H size exposure area 25. Consequently, merely the central quarter of each picture frame photographed in the exposure area 25 by the lens-fitted photo film unit 2 is printed at the twice as large magnification as the standard printing magnification, so the printed picture looks like as if it were photographed through a telephoto lens whose focal length is 48 mm.

In order to allow the photographer to observe and frame the subject the finder optical system 19 in an approximately similar condition to what it is in the printed picture, the finder optical system 19 has such a magnification and an angle of view that make the view field substantially correspondent with the central quarter of the exposure area 25. In that case, the center of the view field is adjusted to the center of the photographic field of the taking lens 3, i.e. the center of the exposure area 25. Accordingly, the subject observed through the finder windows 4 and 10 is approximately twice as large as it is observed through a viewfinder whose view field corresponds to the exposure area 25. For example, since the taking lens 3 has the focal length of 24 mm, the view field of the finder optical system 19 corresponds to a photographic field of a telephoto lens whose focal length is 48 mm.

Since the exposure area 25 of the IX240 type filmstrip 23 has the same aspect ratio as the H size print, and 69% of such a H size exposure area is conventionally used to make a C size print, and also the view field should preferably cover 80–85% of the actually printed area of the picture frame, it is desirable to make the view field of the finder optical system 19 to cover less than 16% of the exposure area 25. In the present embodiment, a central fragment 68 of the exposure area 25 is determined to be printed in C size, so the view field of the finder optical system 19 has the same aspect ratio as the C size print, and is defined to correspond to a central 12% of the exposure area 25. However, these numerical definitions vary depending upon the film type loaded in the lens-fitted photo film unit, such as whether it is of IX240 type or 35 mm type, the focal length of the taking lens 3, and the expected print aspect ratio. For example, it is possible to define the H size print as the print size for the lens-fitted photo film unit 2. In that case, the view field should have the same aspect ratio as the H size print.

Figure 5:
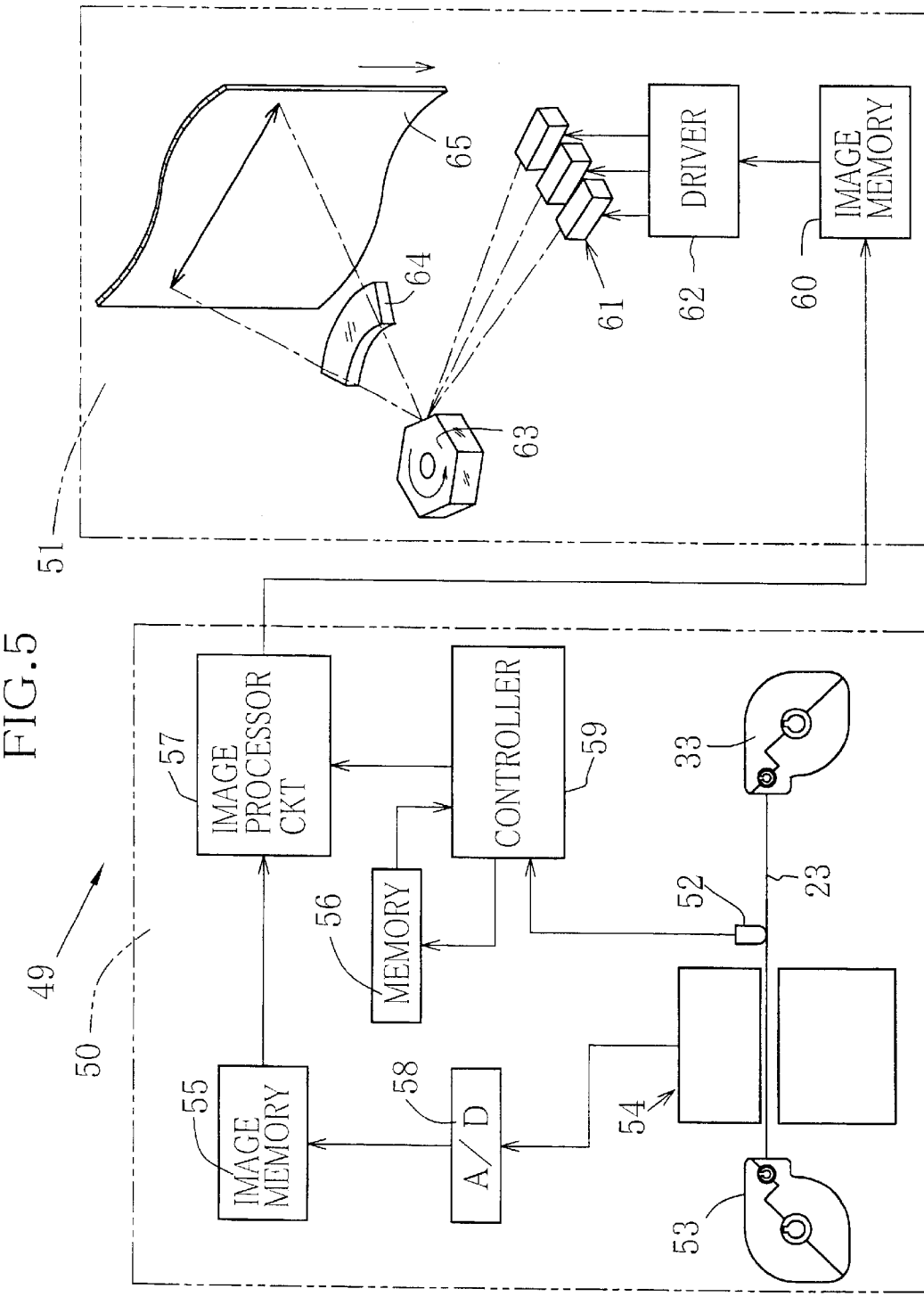
FIG. 5 is a block diagram schematically illustrating a digital printer.

FIG. 5 show an example of a digital printer 49 for use in the printing method for the lens-fitted photo film unit 2 of the above embodiment, that contains the filmstrip 23 having three dots previously recorded as the PAR code 46 on each PAR code recording zone 45. The printer 49 is provided with a modified or additional program on the basis of a program for producing prints in the C size, the H size or the P size from ordinary photo filmstrips or those having the PAR codes 46 in the PAR code recording areas 45.

According to the present embodiment, the PAR code 46 may consist of zero to three dots. When one dot is recorded on the PAR code recording zone 45, it represents the print aspect rate of H size, whereas two dots on the PAR code recording zone 45 represent the print aspect rate of P size, and it represents the print aspect rate of C size when there isn't any dot on the PAR code recording zone 45. However, the relationship between the dot number and the print format or the print aspect ratio is not limited to this embodiment but may be modified appropriately.

The digital printer 49 may be roughly divided into an input section 50 and an output section 51. The input section 50 includes a photo sensor 52, a scanner 54, an image memory 55, a memory 56, an image processor circuit 57, and a not-shown film conveying mechanism for conveying the filmstrip 23 from the cartridge shell 33 to a second cartridge shell 53 that is prepared for printing, and then from the second cartridge shell 58 back to the original cartridge shell 33. A controller 59 controls the total operation of the digital printer 49.

The photo sensor 52 reads out the frame serial number, the PAR code, and other photographically recorded data from the filmstrip 23, and the memory 56 stores the read data for each picture frame. The scanner 54 scans the picture frames of each exposure area 25 to obtain a photoelectric signal of each frame. The photoelectric signal is converted into digital image data through an A/D converter 58, and the image memory 55 stores the digital image data for each frame. The image processor circuit 57 processes the image data so as to correct the image quality. The image processor circuit 57 also refers to the memory 56 to determine a print area of each frame in accordance with the data represented by the PAR code 46.

The output section 51 includes an image memory 60, a laser unit 61 for outputting red, blue and green laser beams, a driver 62 for driving the laser unit 61, a polygon mirror 63, an F-θ lens 64, and a not-shown paper conveying mechanism for conveying a long web of color photographic paper. The image data processed in the image processor circuit 56 is written on the image memory 60, and the driver 62 drives the laser unit 61 in accordance with the image data from the image memory 60, to print the print area of each picture frame on the photographic paper 65.

The above-described lens-fitted photo film unit 2 and the digital printer 49 operates as follows.

Figure 6A:
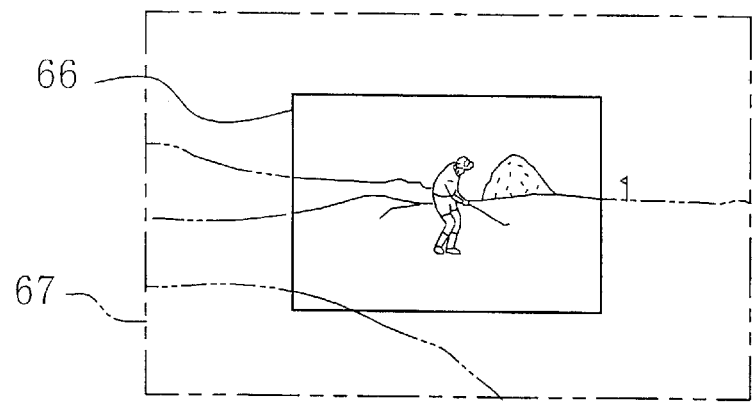
FIG. 6A is an explanatory view illustrating a subject observed in a view field of the film unit of the first embodiment.
Figure 6B:
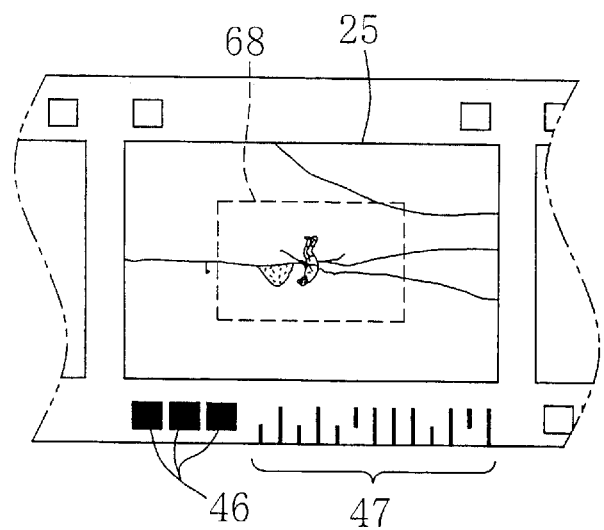
FIG. 6B is an explanatory view illustrating a picture frame photographed from the subject in an exposure area on the photo filmstrip of the film unit of the first embodiment.

As shown in FIG. 6A, when the photographer looks in the eyepiece window 10 of the lens-fitted photo film unit 2, the observed subject in a view field 66 of the finder optical system 19 corresponds to what would be photographed in a central 12% of the exposure area 25, and is twice as great as that observed through a finder optical system whose view field 67 corresponds to the actual photographic field of the taking lens 3 that would be photographed in the exposure area 25. The photographer presses the release button 7 while framing a subject in the view field 66. Then, a picture frame is photographed in the exposure area 25, including all objects in the actual photographic field as well as the framed subject, as shown in FIG. 6B.

When all the available number of exposures have been done on the filmstrip 23, the lens-fitted photo film unit 2 is forwarded to a photofinisher. In the photo-lab, the cartridge shell 33 containing the exposed filmstrip 23 is removed from the lens-fitted photo film unit 2, and the exposed filmstrip 23 is subjected to the development. The developed filmstrip 23 is rewound into the cartridge shell 33, and is put in the input section 50 of the digital printer 49. Then, the developed filmstrip 23 is pulled out from the cartridge shell 33 and is rewound into the second cartridge shell 58. While the filmstrip 23 is being conveyed from the cartridge shell 33 to the second cartridge shell 58, the photo sensor 52 reads out the PAR code 46, the bar code 47 and other imprinted data from the filmstrip 23. Simultaneously, the scanner 54 scans the picture frames at a low resolution (pre-scanning). Image data obtained by the pre-scanning is utilized for controlling the scanner 54 on fine-scanning at a higher resolution and other purposes.

Figure 6C:
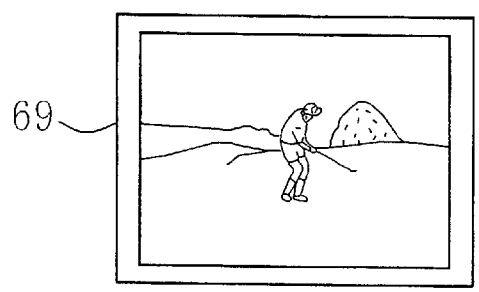
FIG. 6C is an explanatory view illustrating an image in a photographic print produced from the picture frame shown in FIG. 6B.

After the entire length of the filmstrip 23 is wound up into the second cartridge shell 58, the filmstrip 58 is conveyed from the second cartridge shell 58 to the original cartridge shell 33, and the scanner 54 makes the fine-scanning at the high resolution. Image data obtained by the fine-scanning is processed in the image processor circuit 57. Since the PAR code 46 imprinted in the PAR code recording zone 45 of every frame on the filmstrip 23 consist of three dots, the controller 59 determines that the central fragment 68 of the exposure area 25 should be printed at the twice as large magnification as the standard printing magnification. The central fragment 68 is about ¼ of the entire exposure area 25, so approximately a quarter of the image data of each picture frame, as belonging to the central fragment 68 of the exposure area 25, is processed and sent to the image memory 60, so an image of the subject included in the central fragment 68 of the exposure area 25 is printed in a 2-time magnified size on the photographic paper 65, as compared to the standard printing. The image printed in this way on photographic paper 65 is cut into a sheet of C size print 69, as shown in FIG. 6C. This print 69 may be called a 2× tele-converted print, and substantially contains the same subject in the same size as viewed at the photography through the finder of the lens-fitted photo film unit 2.

Figure 7:
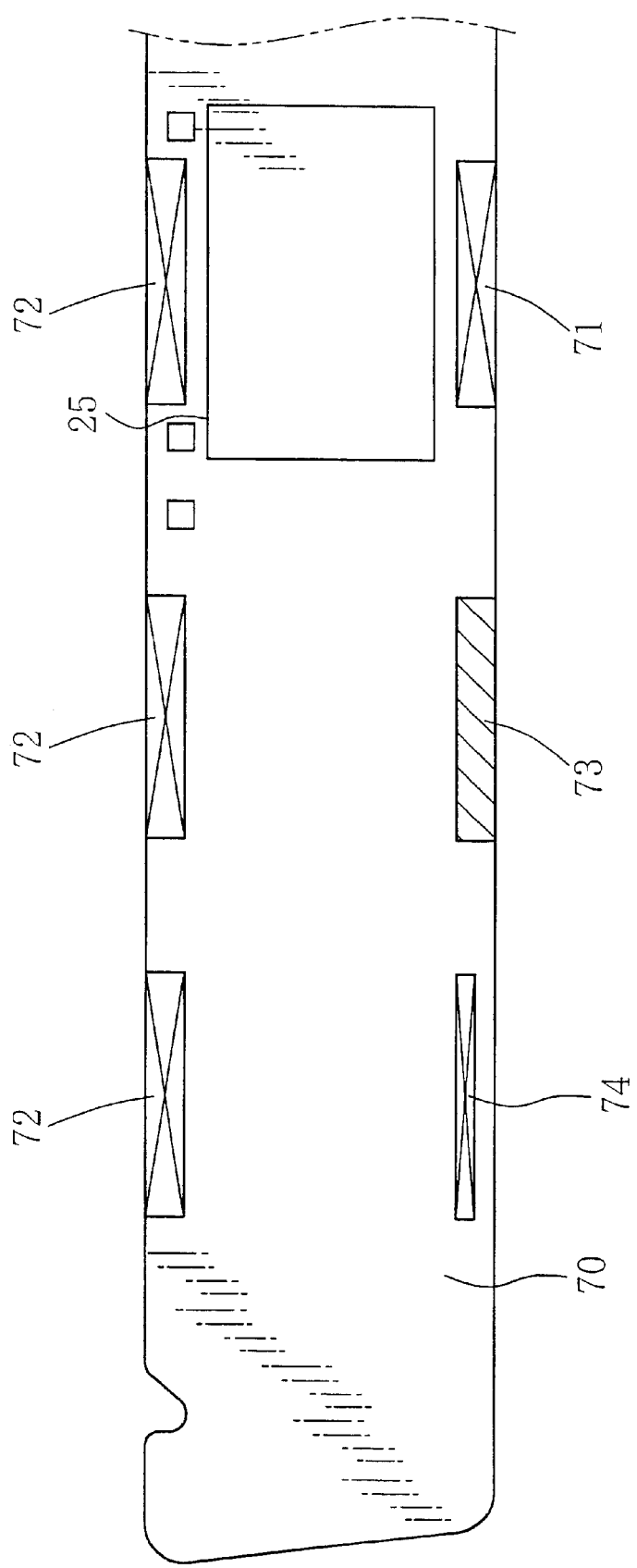
FIG. 7 is an explanatory view illustrating another example of a photo filmstrip of the IX240 type that is pre-loaded in the lens-fitted photo film unit of the first embodiment.

Although the print format data designating the 2× tele-converting printing is imprinted as three dots in the PAR code recording zone 45 of the filmstrip 23 in the above embodiment, the 2× tele-converting data may be recorded magnetically on a magnetic recording layer of the IX240 type filmstrip, the magnetic recording layer is provided on a back side opposite to a photosensitive emulsion layer. As shown for example in FIG. 7, an IX240 type filmstrip 70 is provided with magnetic recording tracks 71, 72, 73 and 74. The magnetic recording track 71 located on the bottom margin of each exposure area 25 is for recording photographic data of each frame, like an f-number applied to that frame. The magnetic recording track 72 located along the other side margin of the filmstrip 70 is for recording data of image-processing in the photo-lab. The magnetic recording track 73 on the film leader is for recording the film data.

The print format data designating the 2× tele-converting printing may be recorded on this magnetic recording track 73, when the filmstrip 70 is to be loaded in the lens-fitted photo film unit 2 of FIG. 1. In that case, the digital printer should be provided with a magnetic head for reading the 2× tele-converting data and other data from the magnetic recording track 73. Then, all the picture frames photographed on the filmstrip 70 by the lens-fitted photo film unit 2 are printed as the 2× tele-converted print, in the same way as described with respect to the filmstrip 23. The 2× tele-converting data may be recorded on the magnetic recording track 74, or another appropriate position on the magnetic recording layer. It is also possible to record the same kind of tele-converting data as a bar code on the leading or the trailing end of the photo filmstrip 70.

Although the lens-fitted photo film unit of the above embodiments is assigned to the tele-converting printing at the 2× level of magnification, the print magnification may be modified appropriately, preferably in a range from 2-times to 3-times the standard print magnification. In that case, the finder magnification and the view field of the lens-fitted photo film unit should be adapted to the assigned tele-converting printing magnification.

Figure 8:
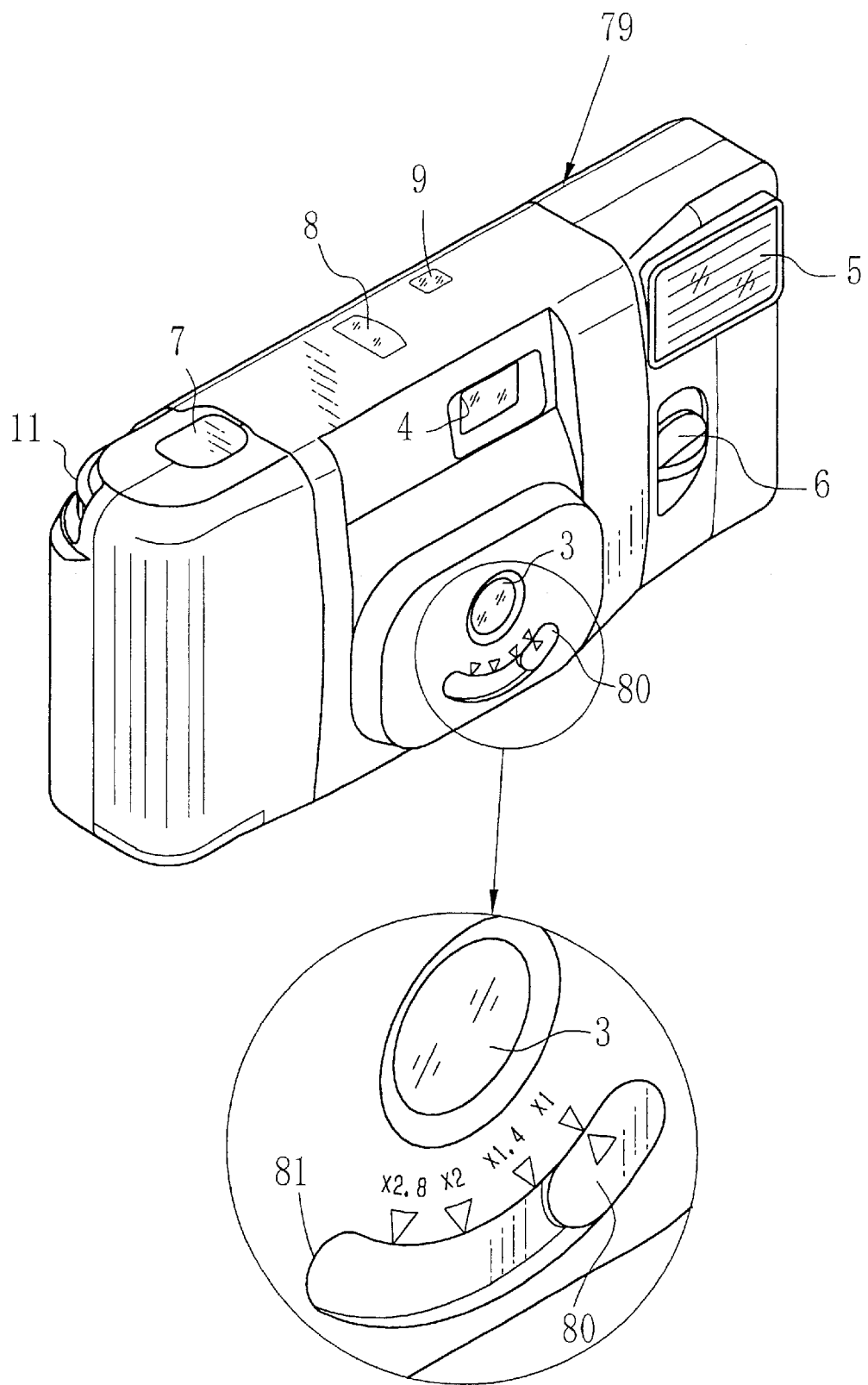
FIG. 8 is a perspective view illustrating a step-zoom type lens-fitted photo film unit according to a second embodiment of the present invention.
Figure 9:
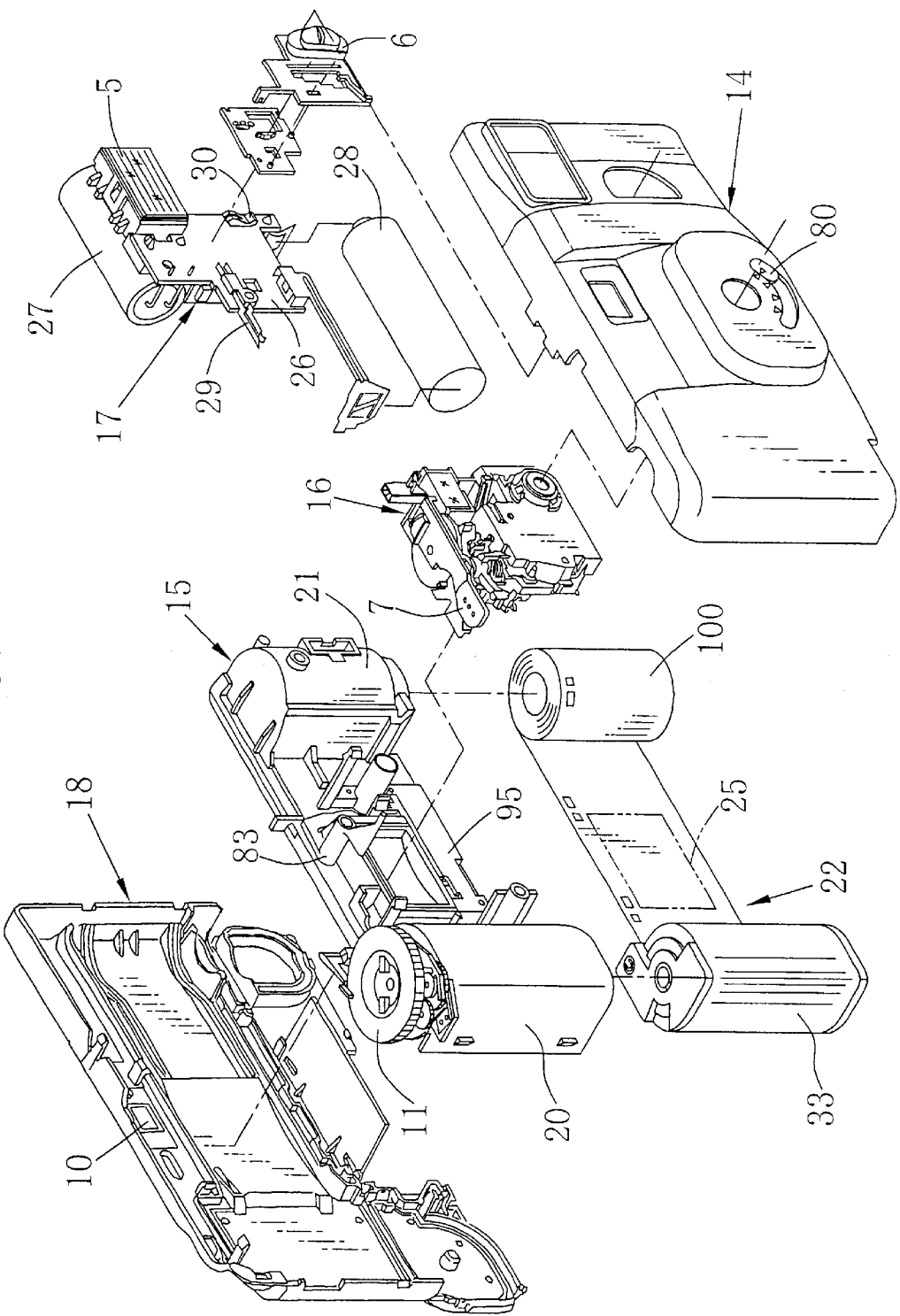
FIG. 9 is an exploded perspective view illustrating the lens-fitted photo film unit of the second embodiment.
Figure 10:
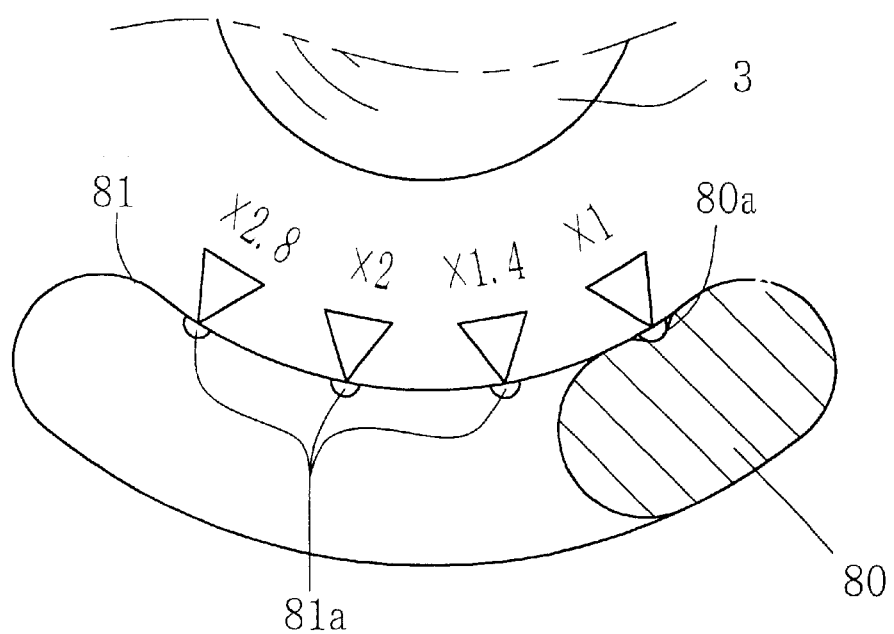
FIG. 10 is an enlarged fragmentary view of the film unit of the second embodiment, illustrating a switching knob for selecting a zoom ratio from among four options.

FIGS. 8 and 9 show an outer appearance and an exploded view of a lens-fitted photo film unit 79 according to another embodiment of the present invention. Since the lens-fitted photo film unit 79 fundamentally has a similar structure to the lens-fitted photo film unit 2, the following description relates only to those features essential for the second embodiment. The lens-fitted photo film unit 79 is a pseudo step-zooming type where the photographer may select a zoom ratio or a print magnification from among four options at each photography, by setting a knob 80 at a desired one of four switching positions indicated by indices ×1, ×1.4, ×2 and ×2.8. The knob 80 may slide along an arched slot 81 that is formed through a front cover 14 of the lens-fitted photo film unit 79 below a lens opening for a taking lens 3. In this embodiment, the taking lens 3 has a fixed focal length that is within a range from 20 mm to 25 mm. The knob 80 is provided with a click notch 80*a*, as shown in FIG. 10, that clicks into engagement with one of protuberances 81*a* which are formed on a rim of the slot 81, to hold the knob 80 in one of the four switching positions.

Figure 11:
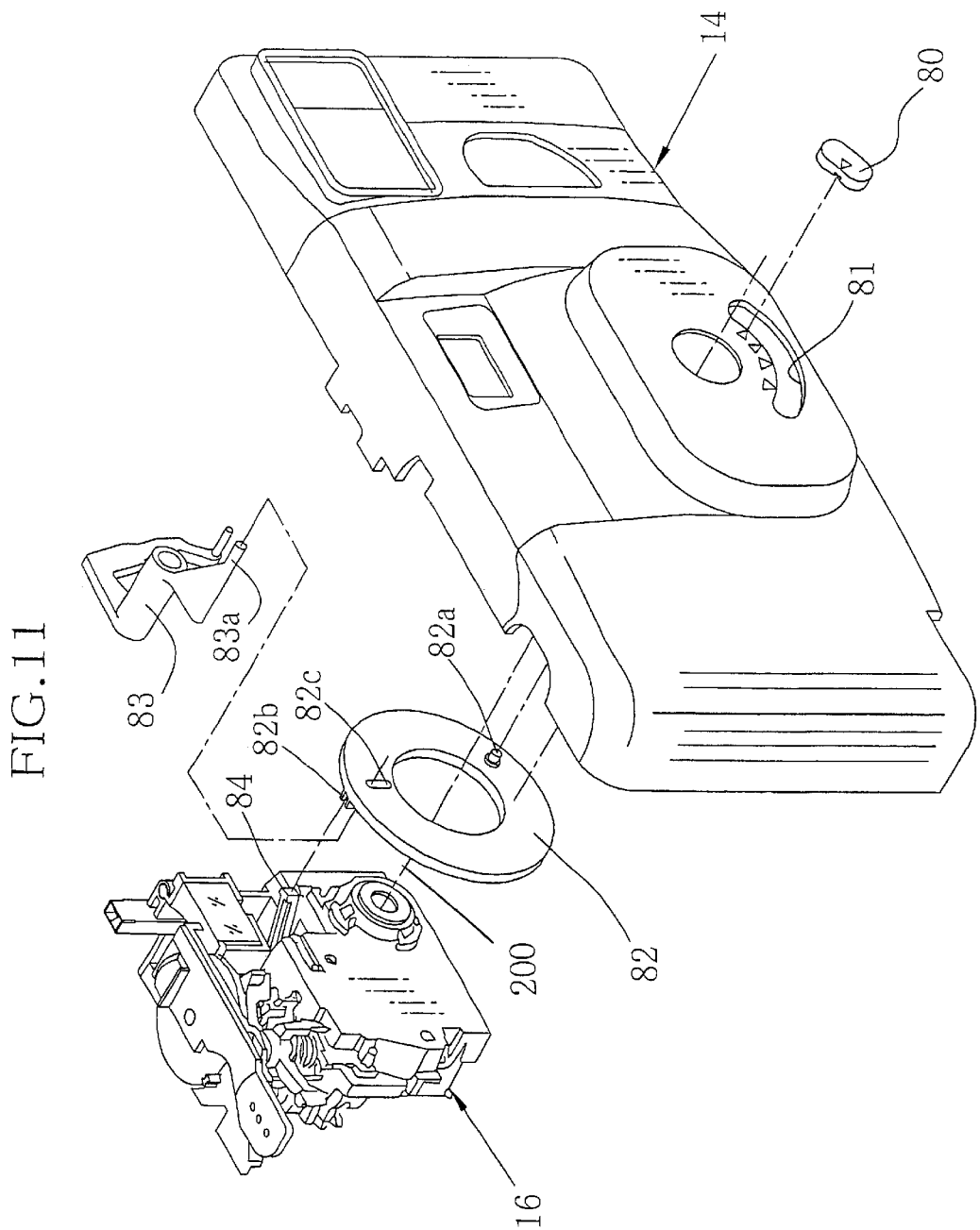
FIG. 11 is an exploded perspective view illustrating an interconnection mechanism for connecting the switching knob to internal mechanisms.
Figure 12:
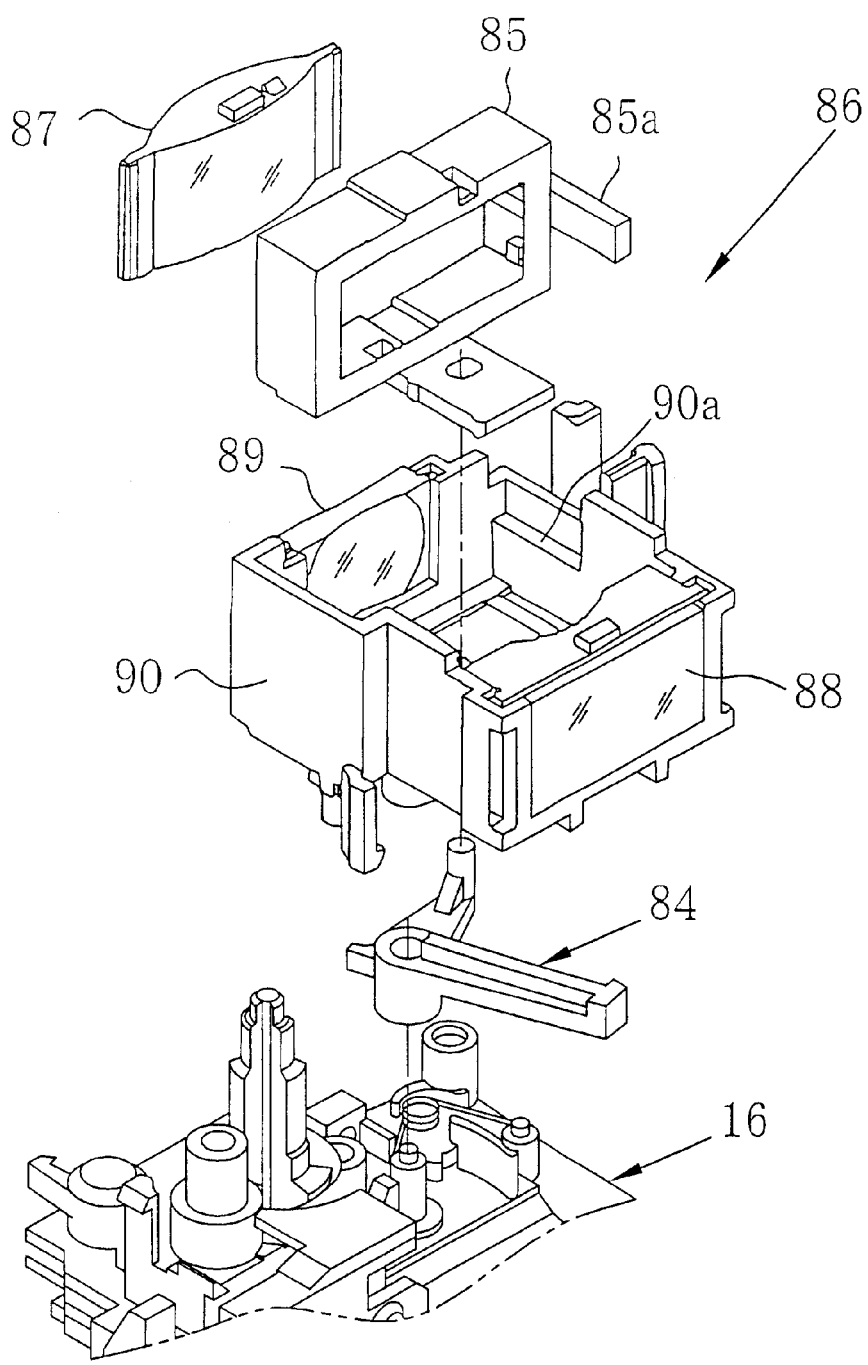
FIG. 12 is an exploded perspective view illustrating a mechanism for changing the finder magnification in cooperation with the switching knob.

As shown in FIG. 11, a switching ring 82 is sandwiched between the front cover 14 and a front of an exposure unit 16 so as to be rotatable about a taking lens optical axis 200, and the knob 80 is fitted on a pin 82*a* that is formed on a lower side of the switching ring 82. The switching ring 82 has an engaging projection 82*a* on its back, that is engaged with a distal end of a finder switching lever 84. As shown in FIG. 12, the finder switching lever 84 is mounted pivotally on the top of the exposure unit 16, and is engaged at another distal end with a movable lens frame 85 of a finder optical system 86 of the lens-fitted photo film unit 76. A finder objective lens 88 and an eyepiece lens 89 of the finder optical system 86 are fixedly held in an immovable lens frame 90, and the movable lens frame 85 holding a conversion lens 87 is mounted in the lens frame 90 in between the objective lens 88 and the eyepiece lens 89. The movable lens frame 85 has a guide rod 85*a* that is guided along a groove 90*a* of the lens frame 90, so the lens frame 85 and thus the conversion lens 87 is movable in an axial direction of the finder optical system 86.

Since the finder switching lever 84 interconnects the movable lens frame 85 to the switching ring 82, the conversion lens 87 moves in cooperation with the sliding movement of the knob 80. When the knob 80 is set at the switching position "×1", as shown in FIG. 8, the conversion lens 87 is placed at a nearest position to the objective lens 88, where the finder optical system 86 provides a view field that substantially corresponds to an actual photographic field of the taking lens 3. Hereinafter, the magnification of the finder optical system 86 in this switching position will be called the standard finder magnification. As the knob 80 slides to the left in the drawings, the conversion lens 88 moves toward the eyepiece lens 89, providing a longer focal length and a greater magnification of the finder optical system 86. That is, the magnification of the finder optical system 86 becomes 1.4-times the standard finder magnification when the knob 80 is set at the switching position "×1.4", and it becomes 2-times the standard finder magnification at the switching position "×2", and 2.8-times the standard finder magnification at the switching position "×2.8".

The switching ring 82 also has a connection hole 82c in its upper portion, for engagement with a connection pin 83a of an interconnection member 83 that is mounted on a basic portion 15 of the lens-fitted photo film unit 79 in a rotatable manner, as shown in FIG. 9. Accordingly, the switching ring 82 and thus the interconnection member 83 rotate with the sliding movement of the knob 80.

Figure 13:
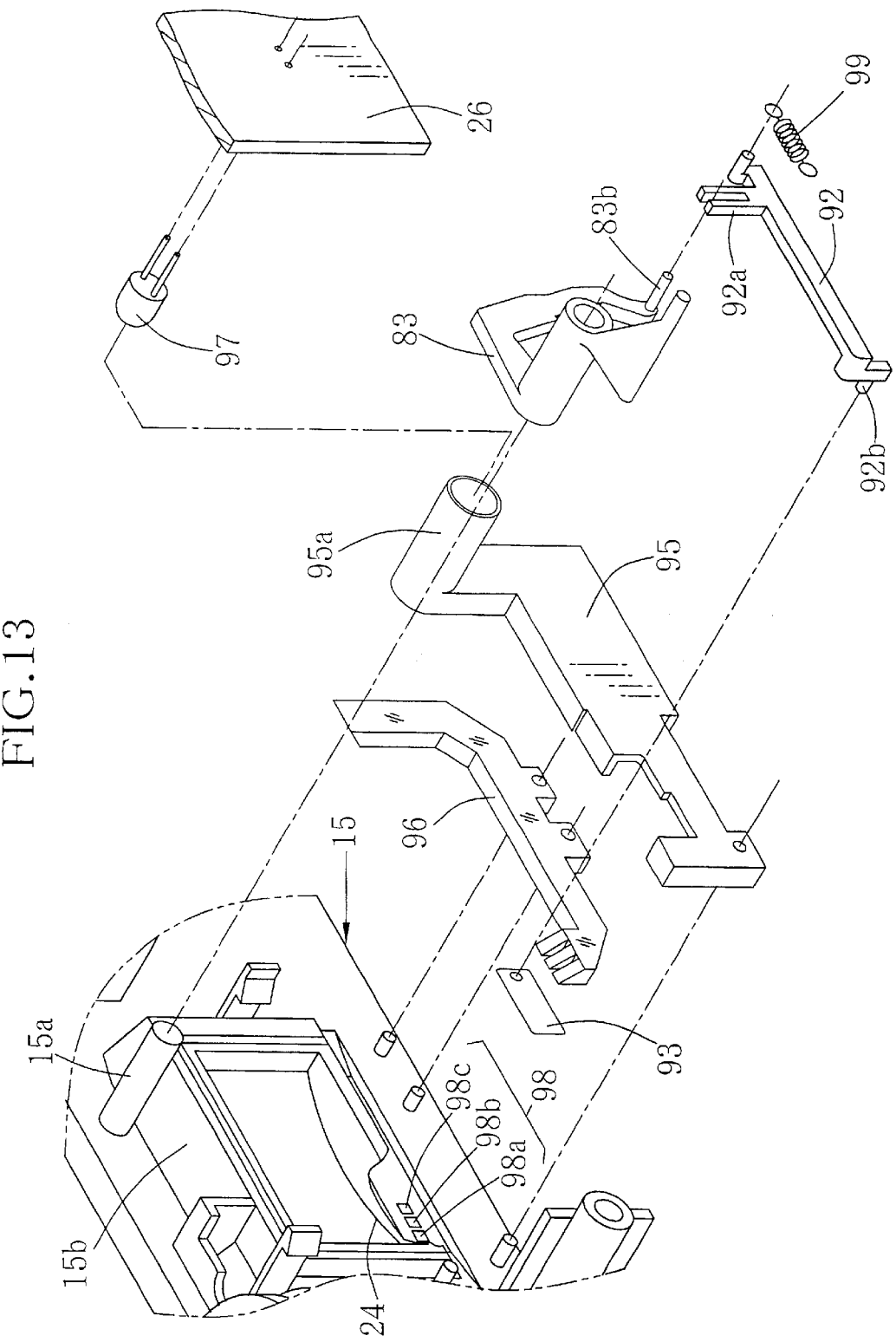
FIG. 13 is an exploded perspective view illustrating a mechanism for recording optical indicia on the photo filmstrip in correspondence with the selected zoom ratio.

As shown in detail in FIG. 13, the interconnection member 83 is mounted on a pivot pin 15a that is formed at an upper right corner of a light-shielding tunnel 15b that is formed to surround an exposure opening 24 of the basic portion 15. A second connection pin 83b is formed at a distal end of a second arm of the interconnection member 83 that extends downward along the right side of the light-shielding tunnel 15b. The second connection pin 83b is engaged in a fork 92a of a switching slider 92 that is mounted below the light-shielding tunnel 15b in a horizontally slidable manner. A masking plate 93 is connected to a pin 92b of the switching slide 92, so the masking plate 93 slides with the switching slider 92 in response to rotation of the interconnection member 83.

A light-shielding cover 95 covers up a light guide 96 that extends from the right side through the bottom side of the light-shielding tunnel 15b. The light-shielding cover 95 also has a forwardly protruding tube 95a whose front end is opposed to a data imprinting LED 97 that is mounted on the back of a printed circuit board 26 of a flash unit 17. The data imprinting LED 97 is connected to a flash circuit of the flash unit 17, so as to emit light whenever a trigger switch 29 of the flash unit 17 is turned on in response to the shutter release operation. The light emitted from the data imprinting LED 97 is conducted through the tube 95a to an input end of the light guide 96, and then conducted through the light guide 96. An output end of the light guide 96 is opposed to three data exposure openings 98a, 98b and 98c that are formed through the basic portion 15 under the lower left corner of the exposure opening 24. Accordingly, the light passed through the data exposure openings 98 falls on a PAR code recording zone 45 (see FIG. 14) of a filmstrip 100 that is loaded in the lens-fitted photo film unit 79 of the second embodiment.

The masking plate 93 moves into or out of a light path from the output end of the light guide 96 to the data exposure openings 98, as it slides with the switching slider 92 in response to rotation of the interconnection member 83, i.e. in cooperation with the sliding movement of the knob 80. When the knob 80 is set at the switching position "×1", the switching slider 92 is placed at its leftmost position, and all the data exposure openings 98 are closed by the masking plate 93. A coiled spring 99 is suspended between the switching slider 92 and the light-shielding cover 95, to bias the switching slider 92 to the left in the drawings.

Figure 14:
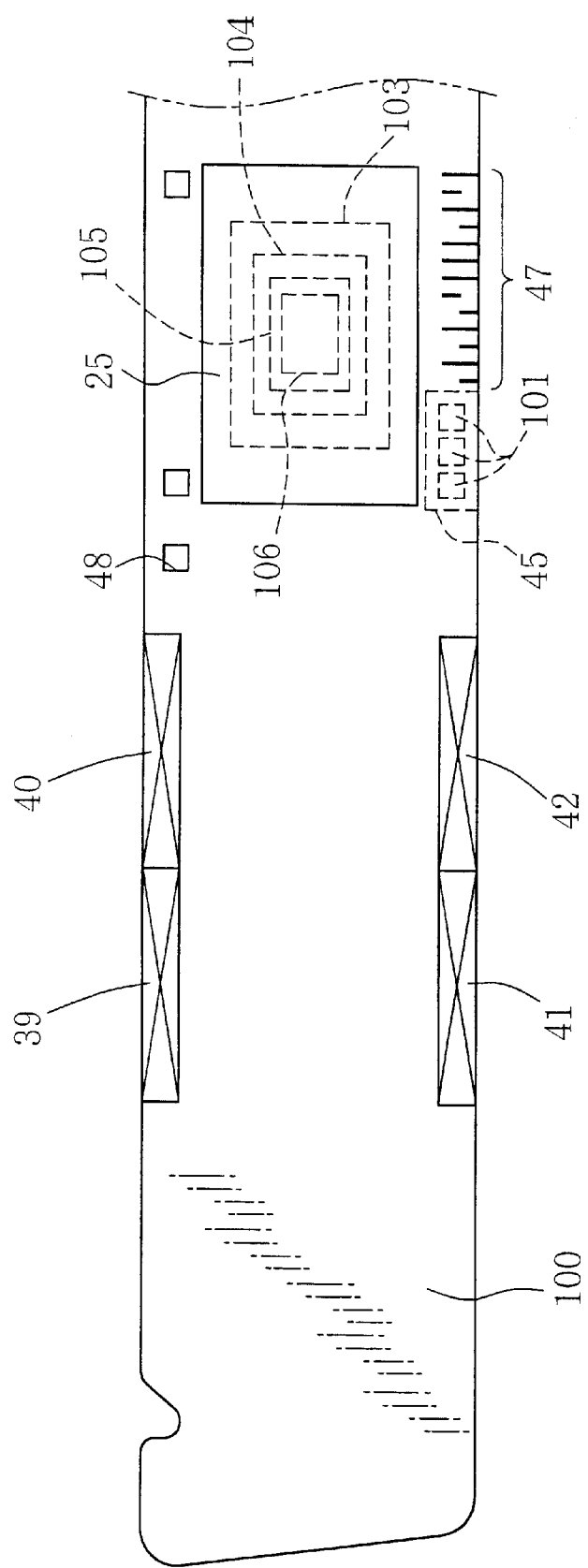
FIG. 14 is an explanatory view illustrating a photo filmstrip of the IX240 type that is pre-loaded in the lens-fitted photo film unit of the first embodiment.

As shown in FIG. 14, the filmstrip 100 loaded in the lens-fitted photo film unit 79 is of IX240 type, and has fundamentally the same structure as the filmstrip 23 loaded in the lens-fitted photo film unit 2 of the first embodiment. However, before the filmstrip 100 is loaded in the lens-fitted photo film unit 79, such film data is recorded on a data recording zone 42 of the filmstrip 100 in addition to a film ID number or code, that notifies that the filmstrip 100 is being loaded in the pseudo step-zooming type lens-fitted photo film unit 79. Furthermore, any dot is not previously imprinted on the PAR code recording zone 45 of the filmstrip 100. Instead, the lens-fitted photo film unit 79 records zero to three dots 101 photographically on the PAR code recording zone 45 of the filmstrip 100 simultaneously when a picture frame is photographed in an exposure area 25. The light emitted from the data imprinting LED 97 is used for recording dots 101 on the PAR code recording zone 45, and the number of dots recorded on the PAR code recording zone 45 is determined by how many data exposure openings 98 are uncovered by the masking plate 93.

Now, the operation of the lens-fitted photo film unit 79 and a printing method for the lens-fitted photo film unit 79 will be described.

Figure 15A:
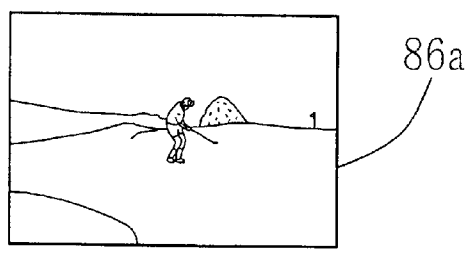
FIG. 15A is an explanatory view illustrating a subject observed in a view field of the film unit of the second embodiment when the switching knob is set at a position of "1×"
Figure 15B:
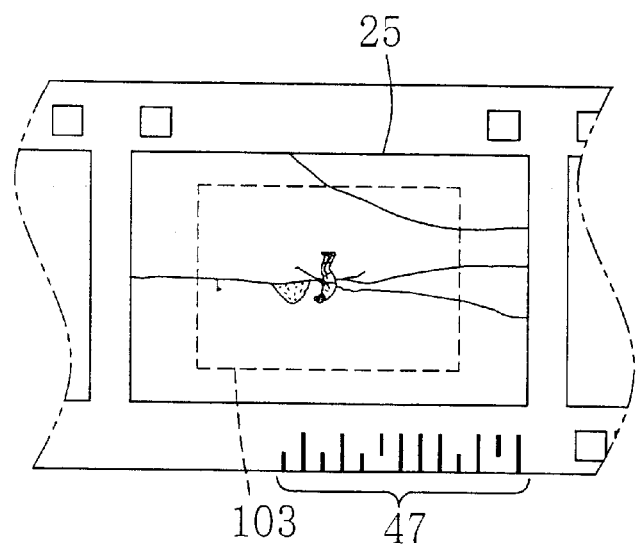
FIG. 15B is an explanatory view illustrating a print area of a picture frame photographed by the film unit of the second embodiment when the switching knob is set at the position of "1×"

Before framing a subject, the photographer selects a zoom ratio by setting the knob 80 at one of the switching positions "×1, ×1.4", "×2" and "×2.8". Then, the focal length of the finder optical system 86 is changed in correspondence with the selected zoom ratio. When the knob 80 is set at the switching position "×1", the finder optical system 86 has the shortest focal length, and thus the standard finder magnification. In this position, as shown in FIGS. 15A and 15B, the finder optical system 86 provides a view field 86a that corresponds to a standard print area 103 for the C size, from which the C size print (89×127 mm) is printed at a standard printing magnification, e.g. 5.7×. It is to be noted that the standard print area 103 for the C size is 15.6×22.3 mm, whereas the exposure area 25 of the IX240 type filmstrip is 16.7×30.2 mm. It is possible to define the H size print as the standard print size for the lens-fitted photo film unit 79. In that case, the view field at the shortest focal length should correspond to a print area from which the H size print is printed at the standard printing magnification.

On the other hand, all the data exposure openings 98 are closed with the masking plate 93 while the knob 80 is set at the switching position "×1". When a release button 7 is pressed in this position, a picture frame is photographed through the taking lens 3 in an entire exposure area 25 on the filmstrip 100 and, at the same time, the data imprinting LED 97 emits light. Since the data exposure openings 98 are all closed, any dot is not recorded on the PAR code recording zone 45, as shown in FIG. 15B.

Figure 16A:
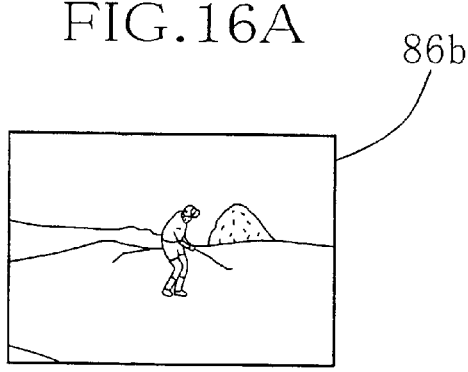
FIG. 16A is an explanatory view illustrating a subject observed in a view field of the film unit of the second embodiment when the switching knob is set at a position of "1.4×"
Figure 16B:
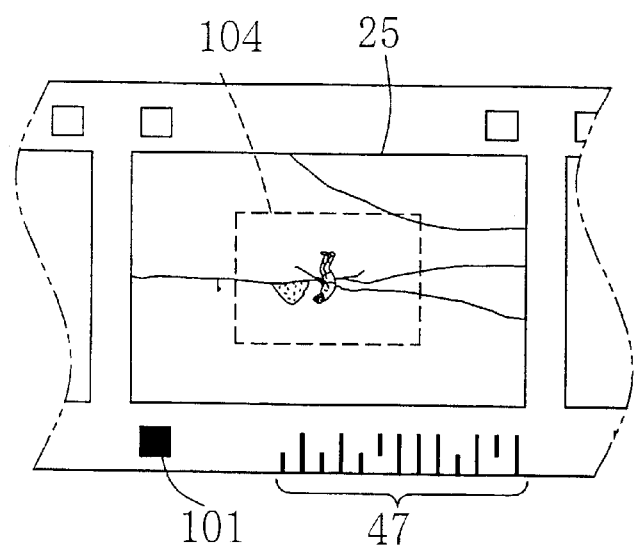
FIG. 16B is an explanatory view illustrating a print area of a picture frame photographed by the film unit of the second embodiment when the switching knob is set at the position of "1.4×"

Thereafter when the knob 80 is set at the switching position "×1.4", the focal length of the finder optical system 86 is elongated to make the finder magnification 1.4-times as large as the standard finder magnification. Then, as shown in FIG. 16A, the finder optical system 86 provides a view field 86b of a narrower view angle than that of the view field 86a, and the subject observed in the view field 86b is magnified 1.4-times as large as that observed in the view field 86a. In this position, the masking plate 93 uncovers the first data exposure opening 98a, so a dot 101 is recorded on the PAR code recording zone 45 in association with a picture frame photographed at the switching position "×1.4", as shown in FIG. 16B.

Figure 17A:
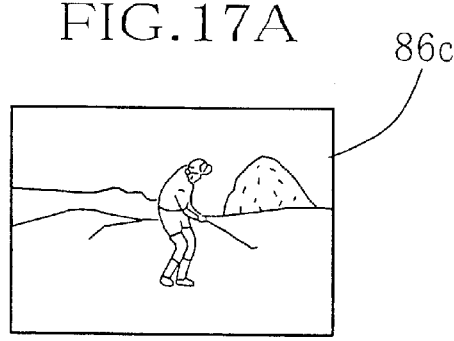
FIG. 17A is an explanatory view illustrating a subject observed in a view field of the film unit of the second embodiment when the switching knob is set at a position of "2×"
Figure 17B:
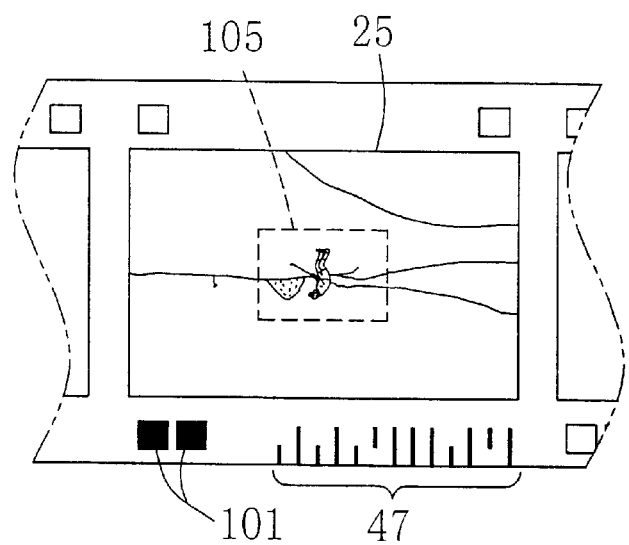
FIG. 17B is an explanatory view illustrating a print area of a picture frame photographed by the film unit of the second embodiment when the switching knob is set at the position of "2×"

In the same way, when the knob 80 is set at the switching position "×2", the finder magnification becomes 2-times the standard finder magnification, so the subject observed in a view field 86c of this position is magnified 2-times as large as that observed at the standard finder magnification, as shown in FIG. 17A. In this position, the masking plate 93 uncovers the first and second data exposure openings 98a and 98b, so two dots 101 are recorded on the PAR code recording zone 45 in association with a picture frame photographed at the switching position "×2", as shown in FIG. 17B.

Figure 18A:
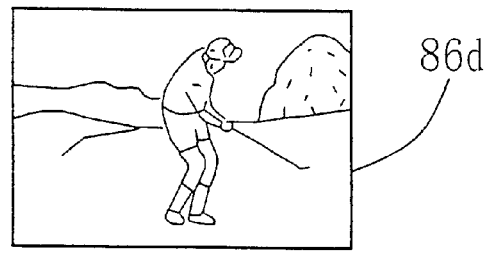
FIG. 18A is an explanatory view illustrating a subject observed in a view field of the film unit of the second embodiment when the switching knob is set at a position of "2.8×"
Figure 18B:
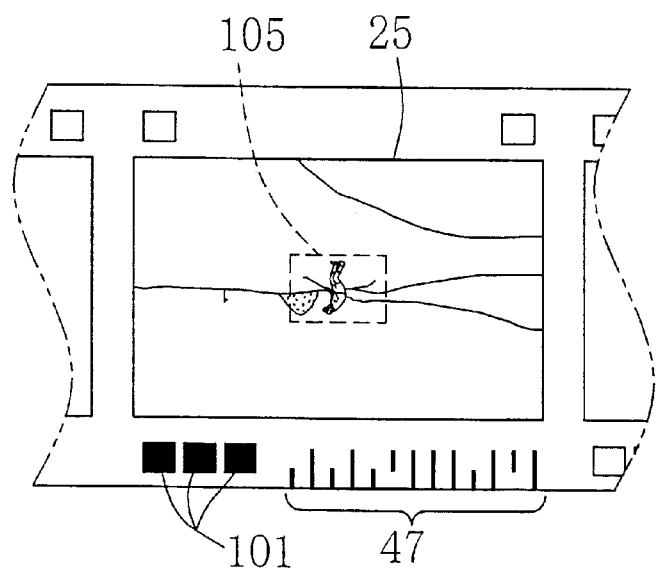
FIG. 18B is an explanatory view illustrating a print area of a picture frame photographed by the film unit of the second embodiment when the switching knob is set at the position of "2.8×"

On the other hand, as shown in FIG. 18A, a view field 86d provided at the switching position "×2.8" of the knob 80 shows the subject 2.8-times as large as that shown at the standard finder magnification. Since the masking plate 93 uncovers all the three data exposure openings 98a to 98c, three dots 101 are recorded on the PAR code recording zone 45 in association with a picture frame photographed at the switching position "×2.8", as shown in FIG. 18B.

When all the available number of exposures have been done on the filmstrip 100, the lens-fitted photo film unit 79 is forwarded to a photofinisher. In the photo-lab, the exposed filmstrip 100 is developed and then placed in a digital printer that may have a similar structure as shown in FIG. 5, but programmed in accordance with the printing method for the pseudo step-zooming type film unit 79.

Concretely, the digital printer is set up with four selectable print magnifications, and one of the four print magnifications is selected for each picture frame in accordance with the number of dots 101 recorded on the PAR code recording zone 45 of each picture frame of the filmstrip 100. In the present embodiment, all the picture frames photographed on the filmstrip 100 by the lens-fitted photo film unit 79 are determined to be printed in the C size, so the relationship between the number of dots 101, the switching position of the knob 80 or the finder magnification, the print magnification and the print area are defined as shown in Table 1.

TABLE 1

| NUMBER OF DOT | FINDER MAGNIFICATION | PRINT AREA (mm) | PRINT MAGNIFICATION |
|---|---|---|---|
| 0 | 1.0× | 15.6 × 22.3 | 5.7× |
| 1 | 1.4× | 11.0 × 15.77 | 8.0× |
| 2 | 2.0× | 7.8 × 11.15 | 11.4× |
| 3 | 2.8× | 5.5 × 7.88 | 16.0× |

Figure 15C:
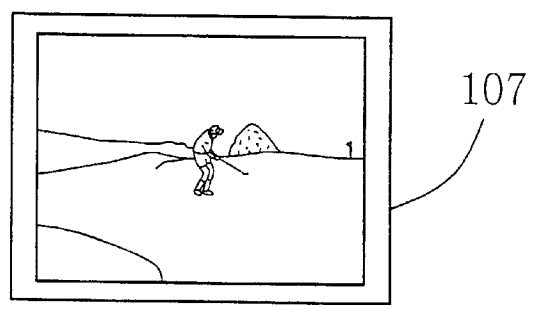
FIG. 15C is an explanatory view illustrating an image in a photographic print produced from the print area of the picture frame shown in FIG. 15B.

Accordingly, if there is not any dot on the PAR code recording zone 45 of a picture frame, as shown in FIG. 15B, the digital printer selects the standard print area 103 (15.6× 22.3 mm) and the standard print magnification (5.7×). Then, as shown in FIG. 15C, a subsequent C size print 107 contains the subject substantially the same condition as viewed at the photography of that picture through the finder as being set at the standard finder magnification of 1.0×.

Figure 16C:
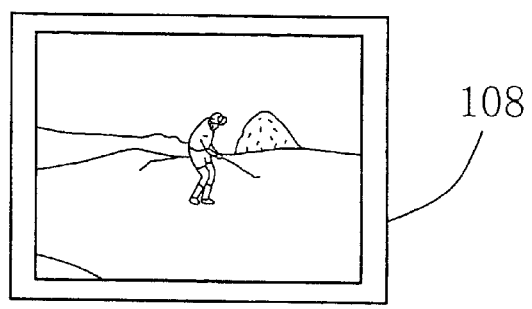
FIG. 16C is an explanatory view illustrating an image in a photographic print produced from the print area of the picture frame shown in FIG. 16B.

If one dot 101 is recorded on the PAR code recording zone 45 of a picture frame, as shown in FIG. 16B, the digital printer selects a print area 104 of 11.0×15.77 mm and a print magnification of 8.0×. Then, as shown in FIG. 16C, a subsequent C size print 108 contains the subject substantially the same condition as viewed at the photography of that picture through the finder as being set at the finder magnification of 1.4×.

Figure 17C:
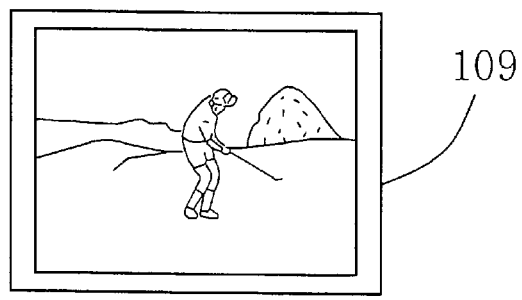
FIG. 17C is an explanatory view illustrating an image in a photographic print produced from the print area of the picture frame shown in FIG. 17B.

If two dots 101 are recorded on the PAR code recording zone 45 of a picture frame, as shown in FIG. 17B, the digital printer selects a print area 105 of 7.8×11.15 mm and a print magnification of 11.4×. Then, as shown in FIG. 17C, a subsequent C size print 109 contains the subject substantially the same condition as viewed at the photography of that picture through the finder as being set at the finder magnification of 2.0×.

Figure 18C:
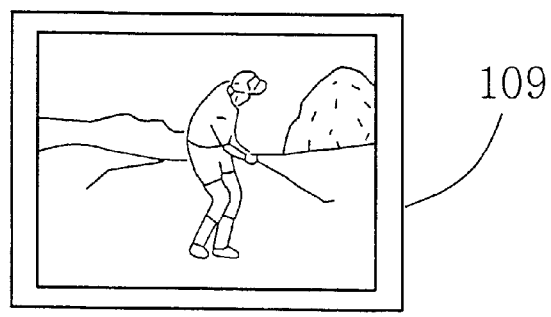
FIG. 18C is an explanatory view illustrating an image in a photographic print produced from the print area of the picture frame shown in FIG. 18B.

If three dots 101 are recorded on the PAR code recording zone 45 of a picture frame, as shown in FIG. 18B, the digital printer selects a print area 106 of 5.5×7.88 mm and a print magnification of 16.0×. Then, as shown in FIG. 18C, a subsequent C size print 110 contains the subject substantially the same condition as viewed at the photography of that picture through the finder as being set at the finder magnification of 2.8×.

The digital printer may discriminate between the filmstrip 100 as loaded in the pseudo step-zooming type film units 79 and other filmstrips, since such film data indicating the pseudo zooming printing is not recorded on those filmstrips which are not loaded in the pseudo step-zooming type film units 79. Therefore, the digital printer may produce photographic prints according to another control program where dots recorded on the PAR code recording zone 45 are considered as the PAR code.

It is to be noted that the above mentioned numerical values are for producing the C size print from the IX240 type photo filmstrip by use of 89 mm wide photographic paper. Therefore, the numerical values should be modified when the H size print is to be produced, or when the photo film cartridge loaded in the pseudo step-zooming film unit is of ISO 135 type, or when the 120 mm wide photographic paper is used.

Since the IX240 type filmstrip 100 is provided with a magnetic recording layer on the back side opposite to a photosensitive emulsion layer, the film data notifying that the filmstrip 100 is being loaded in the pseudo step-zooming type film unit 79 may be magnetically recorded on the filmstrip 100, instead of recording photographically as a bar code on the data recording zone 42.

Although the lens-fitted photo film unit 79 of the above embodiment may change the pseudo zoom ratio in four steps, the present invention is applicable to a pseudo step zoom type film unit having three steps or five or more steps, or to a lens-fitted photo film unit which may be switched over between a standard or wide-angle mode and a pseudo telephoto mode. In any cases, it is desirable to set the maximum pseudo zoom ratio in a range from 2× to 3×. The relationship between the dot number and the pseudo zoom ratio is not limited to this embodiment but may be modified appropriately.

Although the finder magnification is changed in correspondence with the switching position of the knob 80 for selecting the pseudo zoom ratio, in the above described lens-fitted photo film unit 79, it is alternatively possible to maintain the finder magnification unchanged and change the size of the view field by use of a mechanical view field changing device, like a mask plate having apertures of different sizes.

Thus, the present invention is not to be limited to the above embodiment but, on the contrary, various modifications will be possible to those skilled in the art without departing from the scope of claims attached hereto.

What is claimed is:
1. A lens-fitted photo film unit pre-loaded with an unexposed photo filmstrip and provided with photographic mechanisms for taking an exposure, said lens-fitted photo film unit comprising:
a taking lens having a fixed focal length, through which picture frames are photographed in respective exposure areas in a constant size on said photo filmstrip;
print format data prerecorded on said photo filmstrip prior to loading said photo filmstrip in said lens-fitted photo film unit, said print format data indicating that a pre- determined size photographic print is to be produced from a predetermined central fragment of each of the picture frames by enlarging at a specific print magnification; and an optical viewfinder having a view field corresponding to said central fragment of the picture frame, and a magnification corresponding to said specific print magnification, so a subject observed in the view field corresponds in magnification as well as in angle of view to an image contained in a photographic print of the predetermined size as produced from said central fragment;

wherein said specific print magnification is 2-times as large as a standard print magnification that is used for producing a photographic print in said predetermined size from a print area that is approximately equal to said exposure area, and the view field of said viewfinder corresponds to a central 10% to 16% of said exposure area.

2. A lens-fitted photo film unit as recited in claim 1, wherein the focal length of said taking lens is 20 mm to 25 mm.

3. A lens-fitted photo film unit as recited in claim 2, wherein an indicia is provided on an external portion of said lens-fitted photo film unit, for indicating that said lens-fitted photo film unit is directed to producing tele-converted photographic prints that look as if they were photographed through a telephoto lens.

4. A lens-fitted photo film unit as recited in claim 1, wherein said print format data comprises a code consisting of a predetermined number of dots optically prerecorded on a respective data recording zone that is located in a predetermined position adjacent each of said exposure areas.

5. A lens-fitted photo film unit as recited in claim 4, wherein said code is constituted of three dots, and said data recording zone is otherwise used for imprinting an aspect ratio code consisting of zero to two dots to designate a print aspect ratio for a respective picture frame.

6. A lens-fitted photo film unit as recited in claim 1, wherein said photo filmstrip is of IX240 type having a magnetic recording layer on a back side opposite to a photosensitive emulsion layer, and said data is magnetically prerecorded on said magnetic recording layer.

7. A lens-fitted photo film unit as recited in claim 1, wherein said print format data is prerecorded as a bar code on one or both ends of said photo filmstrip.

8. A method of producing photographic prints from picture frames photographed by a lens-fitted photo film unit, said photographic print producing method comprising:

recording, prior to loading an unexposed photo filmstrip in said lens-fitted photo film unit, print format data on said photo filmstrip, said print format data designating that a photographic print of a predetermined size is to be produced from a predetermined central fragment of each of the picture frames, a plurality of data recording zones, each being arranged between one of the picture frames and a first edge of the photo filmstrip, the print format data being recorded in each of the data recording zones, said print format data comprising a code consisting of three dots optically prerecorded on each of the data recording zones;

reading out said data from said photo filmstrip after said photo filmstrip is developed; and printing an image of said central fragment of each of the picture frames onto photographic paper by enlarging at a specific print magnification that is determined based on the size of said central fragment relative to said predetermined print size;

the printing step being performed by a device constructed so that if zero to two dots are detected from one of said data recording zones, a photographic print of an aspect ratio selected from among a plurality of aspect ratios based on the number of dots is produced from a corresponding said picture frame, instead of enlarging a central fragment of the picture frame.

9. A method as recited in claim 8, wherein said specific print magnification is 2-times to 3-times as large as a standard print magnification that is used for producing a photographic print in said predetermined size from a print area that is approximately equal to said exposure area.

10. A method as recited in claim 8, wherein said method uses a digital printer that processes image data obtained by scanning each picture frame, to make printing on the basis of said processed image data.

* * * * *